United States Patent [19]

Smith et al.

[11] Patent Number: 5,337,104
[45] Date of Patent: Aug. 9, 1994

[54] APPARATUS AND METHOD FOR REDIRECTING CAMERA FLASH LIGHT SO AS TO AVOID RED-EYE

[76] Inventors: Neil D. Smith, 159 Maple Ave.; Martin Yate, 9 Central Park, both of Sea Cliff, N.Y. 11579

[21] Appl. No.: 973,615

[22] Filed: Nov. 9, 1992

[51] Int. Cl.$^5$ .................................. G03B 15/03
[52] U.S. Cl. .................................. 354/149.11
[58] Field of Search ........................ 362/16–18; 354/126, 141, 148, 149.1, 149.11

[56] References Cited

U.S. PATENT DOCUMENTS

| | | | |
|---|---|---|---|
| 2,292,044 | 8/1940 | Bucky | 354/77 |
| 3,263,584 | 8/1966 | Knus | 354/126 |
| 3,369,467 | 2/1968 | Land | 354/126 |
| 3,747,488 | 7/1973 | Bennett | 354/126 |
| 3,821,764 | 6/1974 | Shelton | 354/126 |
| 3,925,320 | 4/1976 | Blount | 354/126 |
| 4,019,042 | 4/1977 | Baliozian | 354/126 |
| 4,078,170 | 3/1978 | Sloop | 362/16 |
| 4,085,436 | 4/1978 | Weiss | 354/126 |
| 4,121,232 | 10/1978 | Jones | 354/126 |
| 4,122,333 | 10/1978 | Crouse | 362/18 |
| 4,235,541 | 11/1980 | Jamel | 354/79 |
| 4,333,127 | 6/1982 | Alkema et al. | 362/17 |
| 4,690,531 | 9/1987 | Hansen et al. | 354/149.11 |
| 4,847,647 | 7/1989 | Ueda | 354/149.1 |
| 4,855,771 | 8/1989 | Alligood et al. | 354/149.11 |
| 4,893,139 | 1/1990 | Alligood et al. | 354/149.11 |
| 4,893,140 | 1/1990 | Yamamoto et al. | 344/149.11 |
| 4,897,680 | 1/1990 | Lo | 354/149.11 |
| 4,970,539 | 11/1990 | Sasagaki et al. | 354/149.1 |
| 5,050,044 | 9/1991 | Shibayama | 354/149.1 |

Primary Examiner—David M. Gray
Attorney, Agent, or Firm—Beveridge, DeGrandi, Weilacher & Young

[57] ABSTRACT

An apparatus for redirecting beams of light emanating from the flash of a camera so as to avoid the creation of "red-eye" in a photograph. The apparatus redirects the beams of lights so as to be distanced even further from the central axis of the camera lens. To provide the full effect of the flash, the apparatus redirects the beams of light in a direction parallel to the original direction the light beams travel off from the flash and to the central axis of the lens. The apparatus includes a main body which forms an enclosure with an inlet and outlet opening and is attached to the camera such that the inlet opening is aligned with and covers the camera's flash. The main body includes at least two reflective surfaces for redirecting the flash beam from a first direction to a second direction and then from the second direction to a third direction exiting the main body. The device can be releasably mounted to existing flash cameras (including pop-out flash members). It can also be built into new compact cameras and act as a sliding lens cover and power switch. With the built-in design, the flash of the camera can be directed either vertically or to one side of the camera and a built-in light shifter with single reflective surface is provided to redirect the light parallel and far removed from the central axis of the lens.

25 Claims, 4 Drawing Sheets

APPARATUS AND METHOD FOR REDIRECTING CAMERA FLASH LIGHT SO AS TO AVOID RED-EYE

FIELD OF THE INVENTION

This invention relates to a device which redirects the light from a camera flash further away from the lens so as to avoid "red-eye", a camera assembly which includes the device and a method of using the device.

BACKGROUND OF THE INVENTION

A camera having a flash unit fixed at a position close to the optical axis of the camera lens (as is common for compact cameras) often leads to the undesirable "red-eye" effect appearing in photographs of human subjects (as well as other mammals). In low light conditions for which a flash is used, the pupils of a human subject are dilated. Thus, when the flash emits light beams travelling close to the optical axis of the lens, the beams are reflected from the retina of the subject to produce a photograph in which the eyes appear red due to the blood vessels in the retina being visible about the dilated pupils of the subject.

Various attempts have been made in the prior art to solve the problem of red-eye. However, these devices have proven not to be completely satisfactory as they are often ineffective for many common applications or present complicated assemblies which increase the probability of failure, increase expense and lead to an increase in assembly and set-up requirements.

U.S. Pat. No. 4,078,170 illustrates a multi-component assembly for avoiding red-eye. This assembly includes a frame structure which supports a vertically directed flash and a relatively large reflective screen assembly. The invention of U.S. Pat. No. 4,078,170 would be unsuited for many typical uses (e.g., outside photographs in windy conditions) and is difficult to set-up and disassemble for compact storage. Also, the invention of U.S. Pat. No. 4,078,170 would not be practical for many of the low cost and compact cameras which represent a large share of the camera market.

U.S. Pat. No. 4,690,531 illustrates two different embodiments wherein the flash source pops out from a retracted storage position for avoiding red-eye in narrow field of view photos. The invention of U.S. Pat. No. 4,690,531, while avoiding the problem of assembly and disassembly, relies on a relatively complicated multi-component system that is prone to breakage. Also, the limited extension of the flash limits the ability of the camera to avoid red-eye in many typical use situations. In addition, the multi-component assembly of U.S. Pat. No. 4,690,531 makes it difficult to maintain manufacturing and component costs low.

U.S. Pat. No, 4,847,647 illustrates another attempt to avoid the red-eye effect. As with the aforementioned patents, the invention of U.S. Pat. No, 4,847,647 presents a multi-component structure which would suffer from drawbacks such as high cost, an increased chance of failure and limited applicability.

SUMMARY OF THE INVENTION

The present invention provides a solution to the aforementioned problems associated with the prior art attempts to avoid red-eye. The present invention is easily manufactured at low cost, is adaptable to essentially all compact cameras as an accessory for pre-existing cameras or as a built-in unit for new cameras and is effective for essentially all normal use situations.

In achieving a solution to the aforementioned problems, the present invention features an apparatus for shifting light beams originating from a flash source of a camera, thereby increasing the distance between the flash output and the lens, which then increases the angle of reflection of the light striking the retina so that the red reflected light is not photographed. The apparatus includes a main body having an inlet opening and an outlet opening. The apparatus inlet opening of the main body is positioned over the flash source of the camera. The main body has means for redirecting light beams which emanate from the flash of the camera along an axis in a first direction parallel to the central axis of the lens. This redirecting of the light beams includes first reflecting the light beams off of a first reflective surface into a second travel direction and then further reflecting the light from a second reflective surface into a third direction of travel out through an exit opening in the main body. The light beams exiting the outlet opening of the main body extend essentially parallel to the first direction and at a greater distance from the central axis of the camera lens.

The first and second reflective surfaces are positioned such that the second direction of light beam travel is essentially perpendicular (90°) to the first and third directions of travel. The first and second reflective surfaces are positioned such that the third direction of light beam travel is parallel to the central axis of the lens.

In a preferred embodiment, the first reflective surface is orientated at essentially a 45° angle with respect to a line extending from the flash source to the first reflective surface, and the second reflective surface is orientated at essentially a 45° angle with respect to a line extending from the first reflective surface to the second reflective surface. Preferably, the first and second reflective surfaces each include a planar mirror member. Alternatively, the first and second reflective surfaces can be formed of a polished metallic coating or mylar impregnated plastic.

The main body, except for the inlet and outlet openings, provides an enclosure which is free of openings through which light beams from the flash source can pass. The main body further comprises a plurality of interior surfaces which adjoin the first and second reflective surfaces and are also mirrored for light reflection to ensure for flash transmission. The main body can be formed of a cardboard material, a metal material or of a plastic material.

The present invention can be utilized as either (a) an inexpensive accessory for an existing camera or (b) as a built-in component of a new camera for the purpose of avoiding red-eye.

When the present invention is in the form of a light shifter accessory, slightly different shapes are provided to accommodate different models of existing compact cameras, and to overcome variations in flash type and placement. As an accessory, the invention may be formed of cardboard, plastic or thin metal.

The means for mounting the main body to a camera housing is preferably in the form of a flange extending off from the main body. The flange can be integrally formed with an edge of the main body which defines the inlet opening. In a preferred embodiment, suitable for use with a camera having a flash imbedded in the front face, the flange is formed with a lower planar surface that extends away from the main body in a direction parallel to said first direction of light beam travel. This makes the flange suitable for attachment to the side of the camera whereby the inlet opening is placed over the flash positioned on the front face of the camera. The preferred mounting method during use is to simply hold the light shifter in position on the camera with one finger. Other mounting means feature an adhesive layer for affixing the main body to the camera as well as a removable non-adhesive strip which is positioned over the adhesive layer. In another preferred embodiment, a layer of VELCRO material is secured to the camera while a corresponding layer of VELCRO material is provided on the flange so that the apparatus can be easily attached and detached from the camera. The positioning of the flange and the shape of the main body can be easily varied to accommodate for different camera designs.

The camera assembly of the present invention features a flash light beam shifting device which has a main body with a first reflective surface and a second reflective surface. The flash light shifting device further includes means for mounting the main body to the camera such that a beam of light, originating from the flash member and extending in a first direction of travel away from said flash member, strikes the first reflective surface and is redirected so as to travel in a second direction of travel and contact the second reflective surface so as to be redirected in a third direction of travel extending out of the main body and along an axis which is parallel to the central axis of the lens member. The exiting light beam is also spaced a distance from the central axis of the lens member that is greater than the distance between the central axis of the flash and the central axis of the lens.

The enhanced ability of the present invention to increase the distance of the flash output to the lens axis through the mirrored light shifting device makes the present invention particularly well suited for incorporation into compact cameras. This arrangement provides a means to solve the red-eye problem effectively and with very little, if any, increase in cost of manufacture.

In one embodiment of the invention wherein the flash light beam shifting device is a built-in component of the camera assembly, the beam shifting device is designed to replace the sliding lens cover standard on most compact cameras and provides both a light-shifting function and a lens-covering function depending on its positioning. As with the usual sliding lens cover, the light shifting device activates the camera's power system. To operate in daylight, the light shifter/lens cover slides to a first position which just clears the lens. In the first position the camera power is activated, but the flash is not. The light shifter/lens cover, when in the first position, protrudes only slightly beyond the camera body causing no handling inconvenience.

To operate the flash, the light shifter/lens cover is slid further away from the lens to full extension (position two). In position two, the flash unit is activated for daylight full or low light conditions. For most snapshots the distance of flash output to lens needs to be no more than 4½″ so that at full extension the light shifter/lens cover will extend no more than 1¾″ beyond the camera body. The flash unit is preferably set in the front of the camera, which for most compact cameras is now standard. There is essentially no reduction of light output when the light from the flash passes through the light shifter because the reflectors are 100% reflection type mirrors The arrangement and design of the shifter housing of the present invention provides the added bonus of providing a base for the mounting of simple diffusion and color filters, thereby reducing harsh overlighting also characteristic of modern compact cameras.

In another embodiment of the invention, the camera includes a main housing and means for moving the flash member between a retracted stowage position within the main housing and an extended position wherein at least a portion of the flash member extends out away from the main housing. Also, the main body of the flash light beam shifting device includes a chamber for receiving the flash member when in the extended position such that the central axis of the flash member is at the same level as the first reflective surface and extends along the first direction of travel.

The main body of the flash light beam shifting device includes an inlet opening defined by a first edge of the main body and an outlet opening defined by a second edge of the main body. The main body further includes an interior surface which extends between the first and second edges and about the entire periphery of the inlet and outlet openings so as to provide an enclosure that prevents the escape of any light beams between the inlet and outlet openings. The interior surface of the main body includes a first sloped wall which defines the first reflective surface and a second sloped wall which defines the second reflective surface. These sloped walls either include a planar mirror member, a reflective layer of metallic coating or some other reflective material. In a preferred embodiment, the first and second sloped walls slope at 45° from an intersecting horizontal plane and the second sloped wall is positioned parallel to the first sloped wall.

In another embodiment of the invention wherein the light shifting device is built-in, the camera includes a flash source that has a central axis which is not parallel with the lens axis so that the flash source directs light beams in a direction that is not parallel with the lens axis. For example, in a preferred embodiment of the invention, the flash source directs the light beams in a direction essentially perpendicular to the lens axis (e.g., a flash source positioned on the top, side or bottom of a camera having a lens axis perpendicular to the front face of the camera). The light shifter is positioned to redirect light beams emanating from the flash source such that they are redirected to extend parallel to the lens axis at a distance sufficiently far away to avoid red-eye. Thus, in operation, the activation of the flash source directs light beams in a direction perpendicular to the lens axis and through an inlet of the light shifter. A single reflective surface of the light shifter oriented at essentially 45° to the light beams emanating from the "alternatively" positioned flash source acts to direct the light beam through an opening in the light shifter and in a direction essentially parallel to the lens axis.

The method of the present invention concerns a method of redirecting light beams travelling in a first direction away from a flash source of a camera so as to avoid red-eye. The method includes redirecting the light beams from the first direction of travel with a reflective surface positioned directly in line with a central axis of the flash source. The method includes further redirecting the light beams from the second direction to a third direction of travel with a second reflective surface. The third direction extends essentially parallel to the first direction of travel and the light beams, following further redirecting, are further spaced from a central axis of a lens member of the camera then when the light beams extended in the first direction of travel. Alternatively, the method includes directing light beams emanating from an "alternatively" positioned flash source to a direction parallel to the lens axis by a single reflective surface.

BRIEF DESCRIPTION OF THE DRAWINGS

The present invention will be more fully understood from the detailed description given herein below and the accompanying drawings which are given by way of illustration only, and thus do not limit the present invention and wherein;

FIGS. 1 to 6 show various embodiments of an accessory type light shifter especially suited for use with pre-existing compact cameras;

FIGS. 7 to 10 show a built-in light shifter as part of a new compact camera design.

FIGS. 11 to 13 show a single reflector, built-in light shifter as part of a new compact camera design.

DETAILED DESCRIPTION OF THE PREFERRED EMBODIMENT

Figures 1, 2:
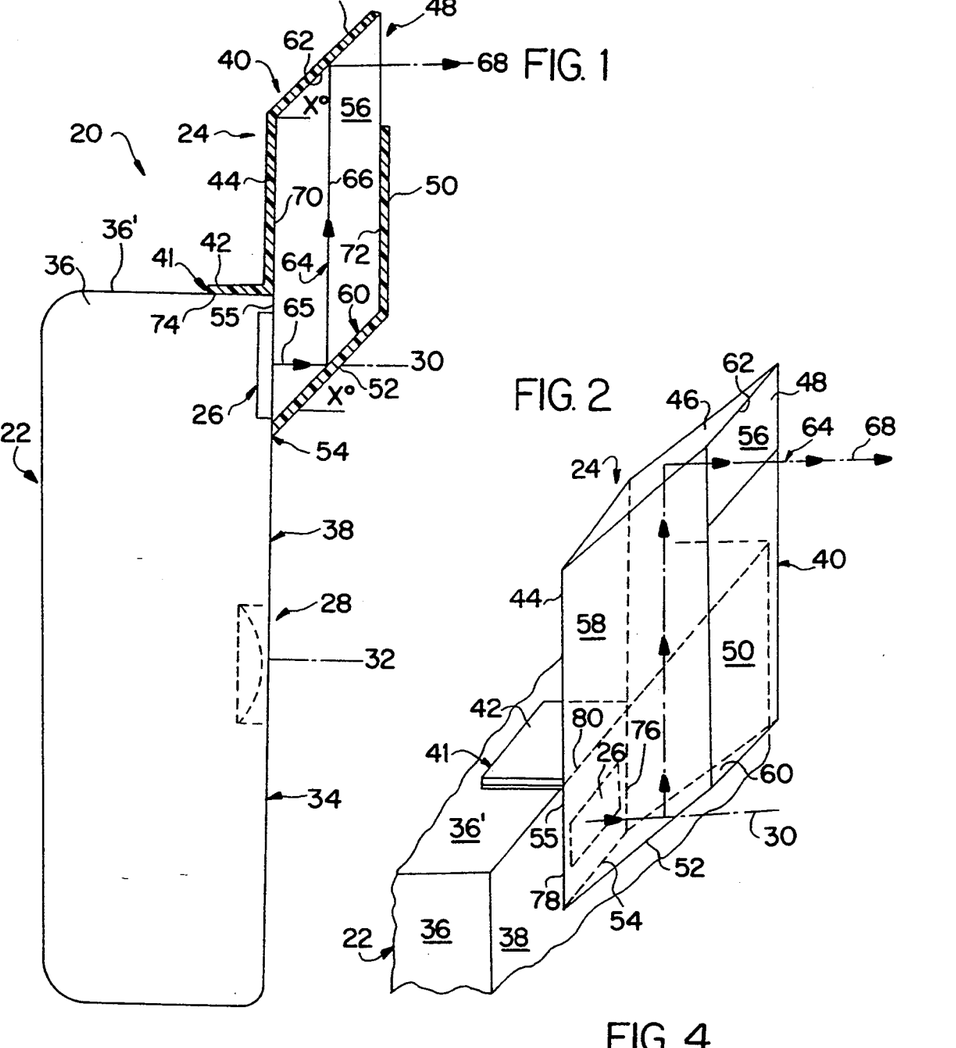
FIG. 1 illustrates a top or plan view of the camera assembly with flash light beam shifting device shown in cross-section.
FIG. 2 illustrates an enlarged perspective and sectional view of that which is shown in FIG. 1.

FIG. 1 shows the top or plan view of the camera assembly 20 which comprises camera 22 and flash light beam shifting device 24 which is shown in cross-section.

Camera 22 represents a schematic illustration of any camera having a flash device 26 and a lens 28. As the present invention is particularly suited for use with compact cameras with a built in flash, the camera embodiment shown in FIG. 1 depicts a compact 35 mm camera with an integral flash device 26 and a mid-positioned lens 28.

Flash device 26 includes central axis 30 and lens 28 features central axis 32. Camera 22 also includes main housing 34 having a planar upper surface 36, a side surface 36' and a planar front face 38. Flash device 26 is illustrated as being coplanar with planar front face section 38 and positioned in the upper region of the planar front face section just below planar upper surface 36. Flash device 26 can take the form of any of the flash devices commonly used in the art.

Flash light beam shifting device 24 includes main body 40. Device 24 also includes mounting means 41 which includes mounting flange 42. Main body 40 has rear wall 44, outwardly sloped outer wall 46, outlet opening 48, front wall 50, sloping front wall 52 having interior edge 54 and inlet opening 55. Main body 40 also includes lower face wall 56 and upper face wall 58 (which is not shown in FIG. 1 due to the cross-sectional depiction but is illustrated in FIG. 2). Except for inlet and outlet openings 48 and 55, the main body is completely enclosed so as to prevent the escape of light passing therethrough.

Main body 40 has first reflective surface 60 and second reflective surface 62. First and second reflective surfaces 60 and 62 preferably include a planar mirror secured to sloping walls 46 and 52, a polished metallic surface or any other material which provides a coating of highly reflective material.

In the embodiment shown in FIG. 1, front sloping wall 52 and outer sloping wall 46 are parallel to one another and are at a slope of X degrees which in a preferred embodiment is 45°.

The front sloping wall 52 and outer sloping wall 46, in some designs, may be preferred to be curved for different light spread and aesthetic design.

As shown in FIGS. 1 and 2, flash light beam shifting device 24 is mounted on camera 22 such that flash light beams (such as light beam 64) emanating from flash 26 are redirected from a first direction 65 extending essentially parallel to axis 30 (e.g., horizontally forward) to a second direction 66 which is essentially perpendicular to axis 30 (e.g., horizontally out from the side). Second reflective surface 62 is positioned such that intermediate leg 66 of beam 64 strikes reflective surface 62 and is redirected in a third direction of travel 68 out through outlet opening 48 in a direction which is preferably parallel to flash axis 30 as well as lens axis 32. Flash light beam shifting device 24 acts to increase the distance between the direction of travel the flash light beams have when originally extending away from the camera and the central axis of the camera lens. In other words, the distance between axis 30 and 32 is less than the distance between light beam leg 68 and axis 32. Moreover, in a preferred embodiment, light beam 64 illustrated in FIG. 1 lies on the same plane as that which both axes 30 and 32 lie.

The additional interior surfaces of main body 40, such as surfaces 70 and 72, are preferably provided with a reflective 100% mirror surface but can also be made of a non-reflective surface with reliance being placed only upon the first and second reflective surfaces for redirecting the flash light beams.

Main body 40 is illustrated as being formed of a plastic material. Mounting flange 42, with lower planar surface 74, is shown lying flush upon planar side surface 36' of camera 22. One method in which mounting means 41 mounts the light shifter to the camera housing includes the positioning of a left finger of a camera operator over flange 42 so that it presses flange 42 inwardly against surface 36'. Alternatively, mounting means 41 can essentially permanently fix main body 40 to the camera or releasably attach main body 40 to the camera. Interior edge 54, lower edge 76, upper edge 78 and outer edge 80 define inlet opening 55 and are also designed to lie flush upon planar front face section 38 and to encompass and cover flash member 26.

Figure 3:
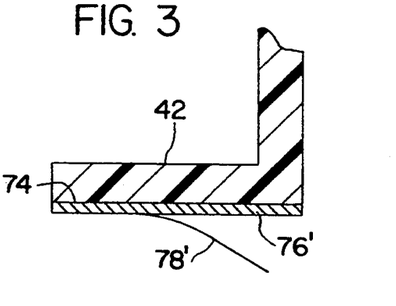
FIG. 3 is a sectional view of the mounting member.

FIG. 3 provides a cut-out, sectional view of an alternate embodiment of mounting means 41 prior to securement to camera 22. As shown in FIG. 3, mounting flange 42 has an adhesive layer 76' formed on planar surface 74. In addition, removable cover sheet 78' is shown in FIG. 3 to be partially peeled away from adhesive layer 76'. Thus, when flash light beam shifting device 24 is to be attached to camera 22, strip 78' is peeled away and mounting flange 42 is adhered to the surface 36' of camera 22 with edges 54, 76, 78, and 80 lying flush with front face 38 and extending about flash 26.

Figure 4:
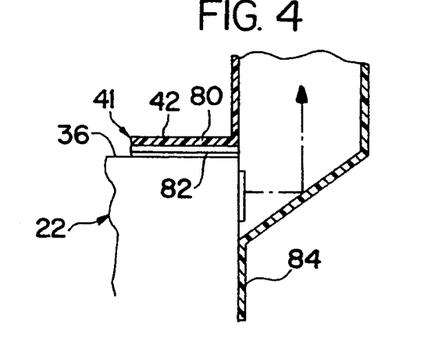
FIG. 4 is a cut away sectional view of a modified embodiment of the flash light beam shifting device with different mounting means.

FIG. 4 shows an alternate embodiment of mounting means 41 for mounting flange 42 to camera 22. In FIG. 4, mounting flange 42 includes a permanently affixed layer of either a hook or loop patch of VELCRO material 81. A corresponding patch 82 of VELCRO material is affixed to surface 36' of camera 22. Thus, with this means of mounting flash light beam shifting device 24 to camera 22, device 24 can be removed or attached with ease at any given moment and will not shift during operation. FIG. 4 also illustrates lower flange 84 which can be provided to add further stability to device 24.

Various other arrangements of releasably mounting device 24 to camera 22 are also possible. For instance, camera 22 can be manufactured to include one portion of a locking assembly as an integral part of the camera housing, while device 24 is formed with the complimentary portion of the locking assembly.

Figure 5:
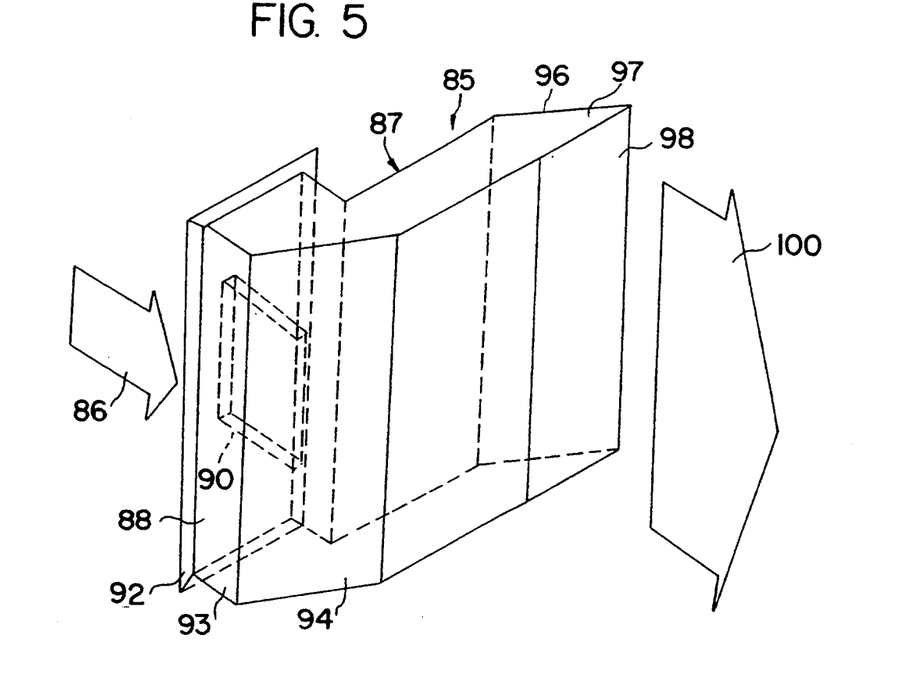
FIG. 5 shows a perspective view of an alternate embodiment of the flash light beam shifting device.

FIG. 5 illustrates an alternate embodiment of the present invention that includes flash light beam shifting device 85 with a different configured main body 87. The perspective view of flash light beam shifting device 85 in FIG. 5 illustrates inlet opening 88 for receiving flash source 86. Inlet opening 88 is surrounded by stabilizing rim 92 which can be provided with adhesive for a more secure mounting or a sealing material to prevent light escape. Mounting flange 90 (similar to that of FIG. 1) extends off of the edge of main body 87 defining inlet opening 88. Main body 87 includes a lower section 93 with walls extending vertically with respect to rim 92 and sloping wall 94 which includes an interior reflective surface for redirecting flash source 86 toward second sloping wall 96 with interior reflective surface 97 which acts to further redirect the flash light out through and beyond exit opening 98 as depicted by exiting flash light arrow 100.

The configuration and arrangement of the flash light beam shifting device and mounting means of the present invention can be varied in accordance with cameras presently on the market. Thus, the inlet opening can be generically designed to accept a wide variety of different shaped flash members and camera housings. Through the use of releasable mounting means, the present invention can also be readily adaptable to a plurality of different camera types that a person might own.

Figure 6:
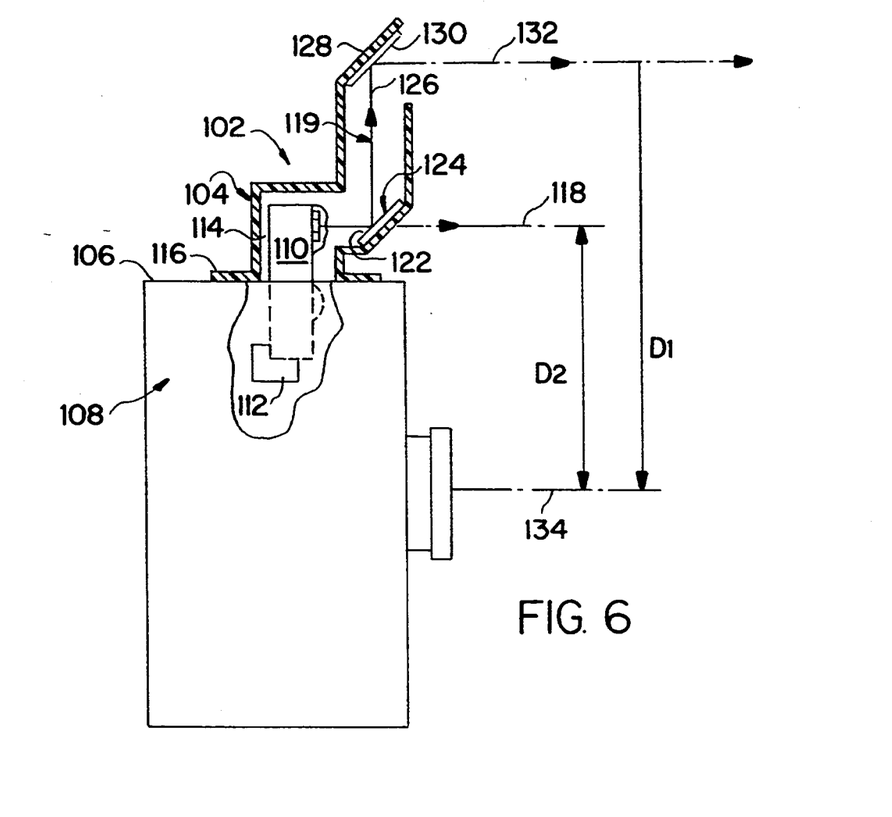
FIG. 6 shows a side elevational view of an alternate embodiment of the camera assembly.

FIG. 6 presents a view similar to that of FIG. 1 except the flash light beam shifting device 102 is designed for use with a different type of flash member and camera. Shifting device 102 is illustrated in FIG. 6 in cross-section. FIG. 6 illustrates shifting device 102 as having main body 104 with mounting base 116 attached to upper surface 106 of camera 108. Camera 108 features pop-up flash 110 which, through use of shifting means 112, is placed either in a storage mode (shown with dashed lines) or an operational mode (shown in solid lines). FIG. 6 illustrates flash 110 in an operational mode and extending within chamber 114 formed in main body 104.

When flash 110 is in an extended state, central axis 118 of flash 110 is at a level wherein a light beam emanating from the flash travels along first travel direction 120 and is redirected off mirror 122 of first reflection surface 124 so as to travel perpendicular to first travel direction 120 (vertically in this embodiment) along second travel direction 126 so as to strike mirror 128 of second reflective surface 130. Light beam 119 is then further redirected along travel direction 132 which, as shown in FIG. 6, is spaced a distance D1 from central lens axis 134. D1 is greater than the distance D2 extending between central flash axis 118 and lens axis 134.

Various other variations in the manner of mounting and configuration are also possible. For example, if the camera includes a side pop-out flash such as that described in U.S. Pat. No. 4,690,521, the flash light beam shifting device can be oriented horizontally rather than vertically such that the flash beam is redirected so as to be even further removed from the central axis of the lens. In this way, the goal of providing good direct illumination of the subject with a flash while avoiding the red-eye effect for a wide variety of camera shots can be achieved.

Figure 7:
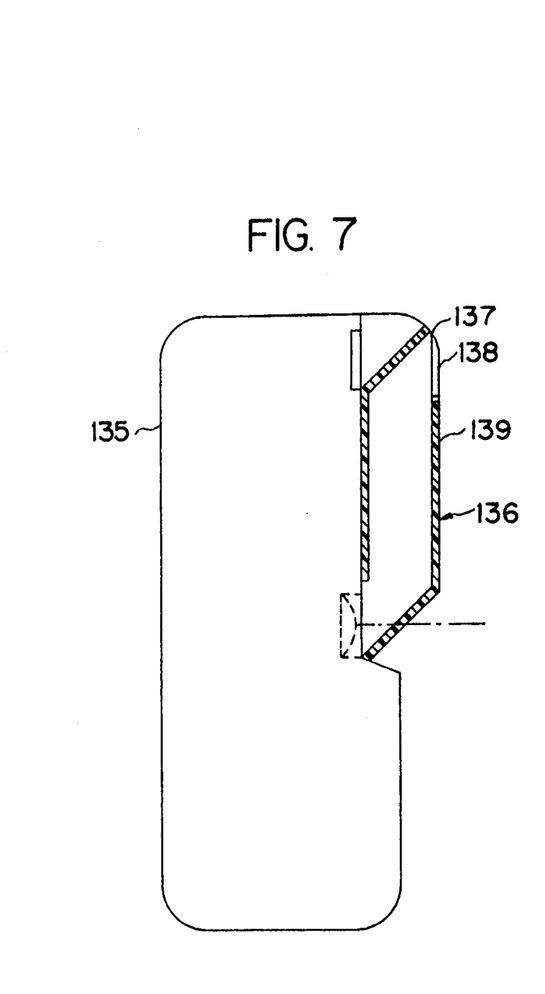
FIG. 7 shows a top view of a camera and a cross-sectional view of a built-in flash light beam shifting device.

FIG. 7 shows a top view of camera 135 with a cross-sectional view of built-in flash light beam shifting device 136 which provides a lens cover function. As shown, the sliding lens cover/flash light shifting device is in a closed position. When the sliding lens cover/flash light shifter is in a closed position, the camera's electrical system is off. Outlet opening 137 is covered with a transparent or translucent cover 138 (e.g., clear plastic) for lens dust protection. Outlet opening 137 may be enlarged to increase the surface area of light output beyond the actual size of flash unit source. Front vertical wall 139 includes means for supporting diffusion and color filter accessories such as flanges (not shown) extending around the flash light output opening that are specifically designed for supporting the diffusion and color filter accessories (e.g., a friction or snap fit).

Figure 8:
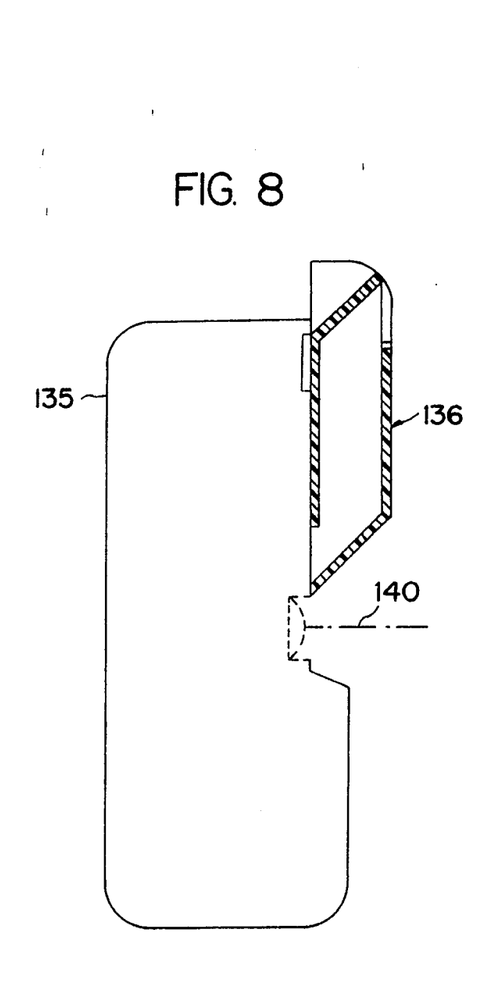
FIG. 8 shows a top view of the camera and shifting device as in FIG. 7 with the shifting device in a first position.

FIG. 8 shows a top view of camera 135 with light shifting device 136 in a first position wherein lens 140 is uncovered, and the camera's electrical system is on. Power to flash unit is still off.

Figure 9:
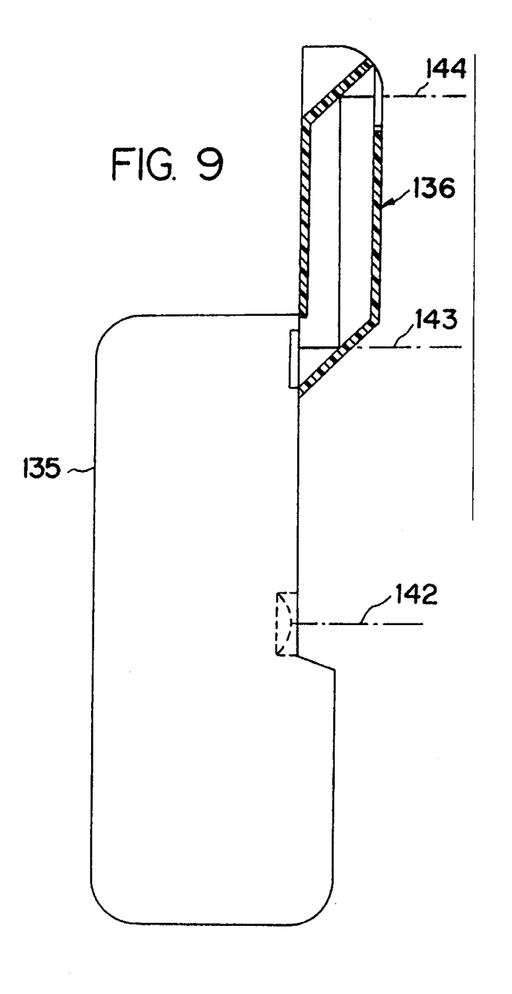
FIG. 9 shows a view similar to FIG. 8 except with the shifting device in a second position.

FIG. 9 shows a top view of camera 135 with light shifting device 136 in a second position wherein electrical power to the camera and flash unit are activated (by any means commonly known in the art). The distance between lens axis 142 to flash unit axis 143 is shifted to flash light beam shifter output axis 144, thereby eliminating the red-eye problem in most flash light photographs.

Figure 10:
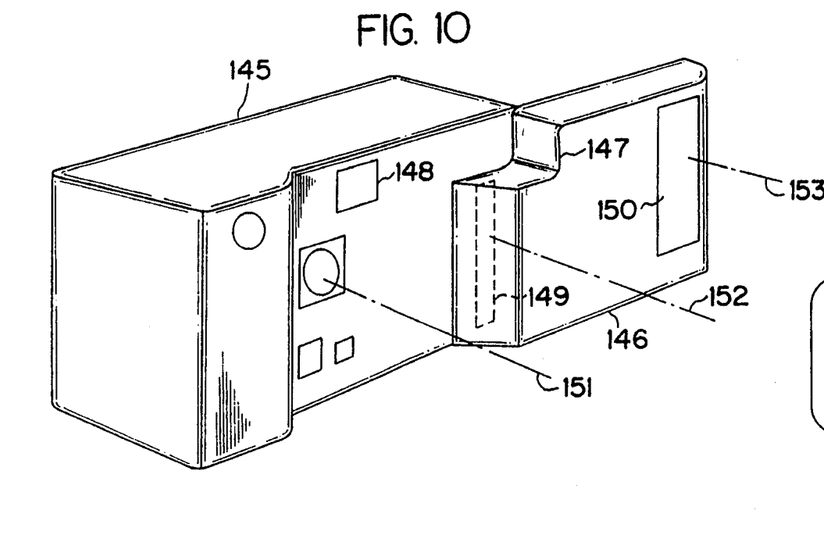
FIG. 10 shows an isometric view of a camera with shifting device in a second (outwardly extending) position.

FIG. 10 shows an isometric view of camera 145 with built-in flash light beam shifter 146 in a second, operational position. Cut-out 147 formed in the shifter illustrates one of many variations that are possible and may be required to accommodate other camera functions, such as view finder 148. Repositioning of flash unit source 149 does not affect subject illumination, particularly if a diffuser is used over the outlet. In the second position, the distance of lens axis 151 to flash light output is increased from flash axis 152 to shifter output 153, thereby eliminating red-eye from most flash illuminated photography.

Figure 11:
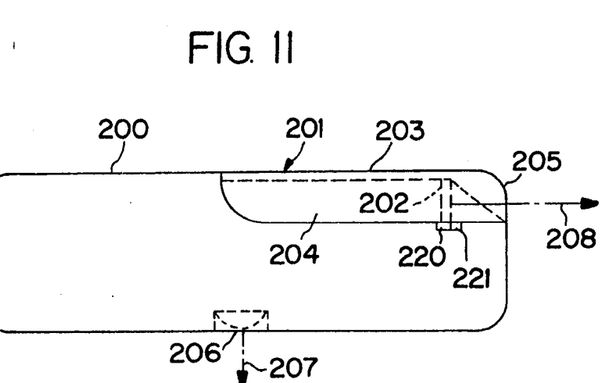
FIG. 11 shows a top view of a camera with an alternative single mirror reflector design in a closed position.

FIG. 11 shows a top view of camera 200 with alternative single mirror reflector device 201 in closed position where unpowered, sideways pointing flash unit 202 is covered by rear planar surface 203, top planar surface 204 and side 205 of the built-in single reflector light shifter. Power means 220 (shown schematically) is provided to power-up flash unit 202 such that it can direct light beams along axis 208. The present invention also contemplates other embodiments of built-in single reflector light shifters which extend vertically to redirect flash emanating from top of the camera (not shown). Lens 206 with lens axis 207 is, in this embodiment, perpendicular to the flash unit axis 208.

Figure 12:
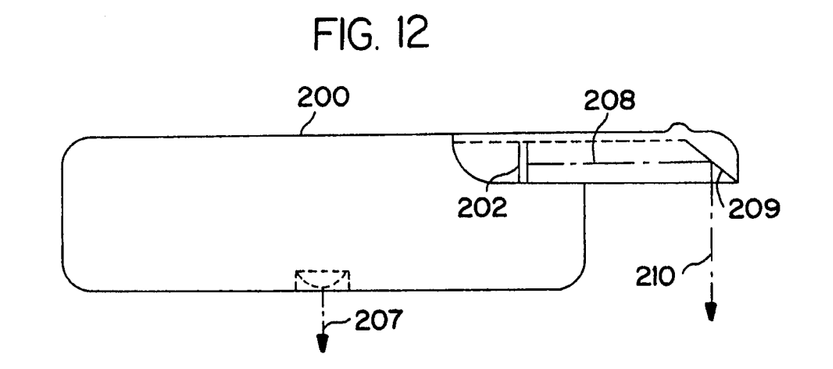
FIG. 12 shows a view of the camera in FIG. 11 with the single mirror reflector in operating position.

FIG. 12 shows the same view of camera 200 with single mirror or surface reflector in operating position. The shifting of the single mirror reflector triggers switch 221 to automatically power-up flash unit 202 by activating power means 220. Flash axis 208 strikes shifter mirror 209, which is set at the preferred angle of 45°, and redirects flash axis 208 perpendicularly to shifter light axis 210 which is parallel to lens axis 207. In this shifter position, the distance from lens axis to shifter-light axis is sufficient to eliminate red-eye in most flash-lit snapshots.

Figure 13:
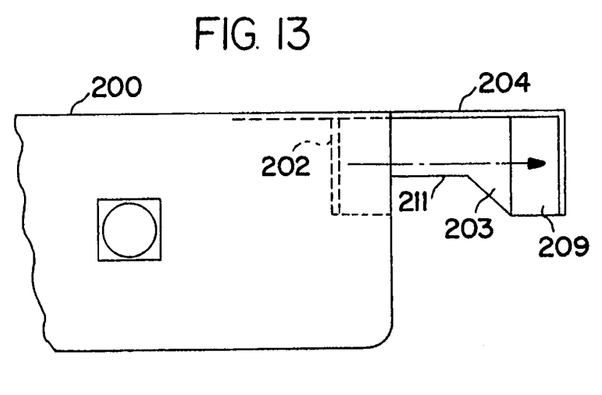
FIG. 13 shows a cut away front elevational view of the embodiment of FIG. 11.

FIG. 13 shows a cutaway of the front view of camera 200 with single reflector shifter in operating position where sideways-mounted flash 202 is angled to strike reflector 209. Shifter top 204 and rear surface 203 both are built to clip into slots on the camera to slide easily into open and closed positions. Top and rear surface 204 and 203 both supply support for reflector 209 and strength to the shifter. Rear wall cutaway 210 reduces the mass of the shifter without loss of structural strength. Cut away 211 ensures that other camera requirements are not impeded by placement of the single reflector flash light beam shifter.

What is claimed is:

1. An apparatus for shifting light beams originating from a flash source of a camera, comprising:
    a main body having an inlet opening and an outlet opening;
    means for mounting the inlet opening of said main body over the flash source of the camera such that the inlet opening extends about and surrounds the flash source so as to avoid a splitting of the light beams originating from the flash source.
    said main body including a first reflective surface positioned downstream in a direction of travel of the light beams from the flash source when said main body is mounted on the camera, said first reflective surface being positioned to redirect the beams of light from a first direction of travel to a second direction of travel,
    said main body also including a second reflective surface positioned downstream in a direction of light beam travel from said first reflective surface, said second reflective surface being positioned so as to redirect the beams of light reflected by said first reflective surface from the second direction of travel to a third direction of travel which extends through the outlet opening of said main body.

2. An apparatus as recited in claim 1, wherein said first and second reflective surfaces are positioned such that said first and third directions of light beam travel extend essentially parallel to one another.

3. An apparatus as recited in claim 2, wherein said first and second reflective surfaces are positioned such that said second direction of light beam travel is essentially perpendicular to said first and third directions of light beam travel.

4. An apparatus as recited in claim 1, wherein the camera includes a lens having a central axis and said first and second reflective surfaces are positioned such that said third direction of light beam travel is parallel to the central axis of the lens.

5. An apparatus as recited in claim 4 wherein, when the main body is mounted on the camera, the flash source is positioned so as to direct beams of light essentially parallel to the central axis of the lens, and said first reflective surface is orientated at essentially a 45° angle with respect to a line extending from the flash source to said first reflective surface, and said second reflective surface is orientated at essentially a 45° angle with respect to a line extending from the first reflective surface to said second reflective surface.

6. An apparatus as recited in claim 1, wherein said main body, except for said inlet and outlet opening, provides an enclosure which is free of openings through which light beams from the flash source can escape.

7. An apparatus as recited in claim 1 wherein said mounting means includes a flange extending off from said main body.

8. An apparatus as recited in claim 7 wherein said flange has a lower planar surface that extends away from said main body in a direction parallel to said first direction of light beam travel.

9. An apparatus as recited in claim 1 wherein said main body further comprises a plurality of interior surfaces which adjoin said first and second reflective surfaces and are also light reflective.

10. A camera assembly, comprising:
    a camera which includes a flash member and a lens member, a central axis of said flash member being spaced a first distance from a central axis of said lens member;
    a flash light beam shifting device which includes a main body having an inlet opening, a first reflective surface and a second reflective surface, said flash light shifting device further including means for mounting said main body to said camera such that all light beams emanating from the flash member are directed through the inlet opening so as to avoid a splitting of light beams emanating from the flash member and such that a beam of light, originating from said flash member and extending in a first direction of travel away from said flash member, strikes said first reflective surface and is redirected as to travel so in a second direction of travel and contact said second reflective surface so as to be redirected in a third direction of travel extending out of said main body and along an axis which is parallel to the central axis of the lens member and spaced a distance from the central axis of said lens member that is greater than said first distance.

11. A camera assembly as recited in claim 10 wherein said camera includes a main housing and means for moving said flash member between a retracted stowage position within said main housing and an extended position wherein at least a portion of said flash member extends out away from said main housing, and said mean body of said flash light beam shifting device including a chamber for receiving said flash member when in the extended position such that the central axis of the flash member intersects said first reflective surface.

12. A camera assembly as recited in claim 10 wherein said main body of said flash light beam shifting device includes the inlet opening defined by a first edge of said main body and an outlet opening defined by a second edge of said main body, and said main body having an exterior surface which extends between said first and second edges and extends about the entire periphery of said inlet and outlet openings so as to provide an enclosure that prevents the escape of any light beams between said inlet and outlet openings.

13. A camera assembly as recited in claim 12 wherein said interior surface of said main body includes a first sloped wall which defines said first reflective surface and a second sloped wall which defines said second reflective surface.

14. A camera assembly as recited in claim 13 wherein said first and second sloped walls have a slope of 45°.

15. An apparatus for redirecting light beams emanating from a flash of a camera away from a lens of the camera so as to avoid red-eye, comprising
a main body which is in the form of an enclosure with an inlet opening and an outlet opening,
mounting means for mounting the inlet opening of said main body over the camera flash, said main body including means for redirecting light beams emanating from the camera flash in a first direction parallel to a central axis of the camera lens, when said main body is mounted on the camera, such that the light beams exit the outlet opening parallel to the first direction and further removed from the central axis of the camera lens than when travelling in the first direction, and the inlet opening extending about said camera flash such that a splitting of light beams emanating from the flash is avoided.

16. A camera assembly as recited in claim 15 wherein said means for redirecting light beams includes a first reflective surface formed on an interior surface of said main body which is oriented at essentially 45° with respect to a central axis of the flash member, and a second reflective surface which is oriented at essentially 45° with respect to a line extending between said first and second reflective surfaces.

17. A camera assembly as recited in claim 15 wherein said mounting means is dimensioned and arranged such that said main body is shiftable in position with respect to said camera from a storage position wherein said inlet opening is away from said flash to an operating position wherein said inlet opening extends about said flash.

18. A camera assembly, comprising:
a camera housing which supports a lens having a central axis which extends in a first direction;
said camera housing further supporting a flash unit which has a central axis extending in a non-parallel relationship with the central axis of the lens;
said camera housing further supporting a flash light beam shifting device having a main body that supports a reflective surface which is adapted to redirect light beams emanating from the flash unit from a first direction extending essentially parallel to the central axis of the flash unit to a second direction extending essentially parallel to the central axis of said lens, and said main body being directly supported by the camera housing such that the main body and flash light beam shifting device encompass the flash, and wherein the main body of said flash light beam shift device includes a rear wall slidingly received within a shoulder portion formed in said housing and an upper wall extending off from said rear wall which also is slidingly received by said housing such that when in a contracted and an extended position said flash unit is encompassed by said rear wall and upper wall of said main body and said shoulder portion of said camera housing.

19. A camera assembly, comprising:
a camera housing which supports a lens having a central axis which extends in a first direction;
said camera housing further supporting a flash unit which has a central axis extending in a non-parallel relationship with the central axis of the lens;
said camera housing further supporting a flash light beam shifting device having a main body that supports a reflective surface which is adapted to redirect light beams emanating from the flash unit from a first direction extending essentially parallel to the central axis of the flash unit to a second direction extending essentially parallel to the central axis of said lens, and said main body being directly supported by the camera housing such that the main body and flash light beam shifting device encompass the flash unit, and wherein said flash light beam shifting device is slidable with respect to said housing from a stowage position to an operating position, and said camera assembly comprising a switch and a flash unit power source and said switch being dimensioned and arranged such that sliding said light beam shifting device from the stowage mode to an operation mode triggers said switch so as to activate said power source.

20. A camera assembly, comprising:
a camera which includes a first member and a lens member, a central axis of said flash member being spaced a first distance from a central axis of said lens member;
a flash light beam shifting device which includes a main body having a first reflective surface and a second reflective surface, said flash light shifting device further including means for mounting said main body to said camera such that a beam of light, originating from said flash member and extending in a first direction of travel away from said flash member, strikes said first reflective surface and is redirected so as to travel in a second direction of travel and contact said second reflective surface so as to be redirected in a third direction of travel extending out of said main body and along an axis which is parallel to the central axis of the lens member and spaced a distance from the central axis of said lens member that is greater than said first distance, and wherein said camera includes a main housing and means for moving said flash member between a retracted stowage position within said main housing and an extended position wherein at least a portion of said flash member extends out away from said main housing, and said main body of said flash light beam shifting device including a chamber for receiving said flash member when in the extended position such that the central axis of the flash member intersects said first reflective surface.

21. An apparatus for redirecting light beams emanating from a flash of a camera away from a lens of the camera so as to avoid red-eye, comprising
a main body which is in the form of an enclosure with an inlet opening and an outlet opening, mounting means for mounting the inlet opening of said main body over the camera flash, said main body including means for redirecting light beams emanating from the camera flash in a first direction parallel to a central axis of the camera lens, when said main body is mounted on the camera, such that the light beams exit the outlet opening parallel to the first direction and further removed from the central axis of the camera lens than when travelling in the first direction, and wherein said mounting means is dimensioned and arranged such that said main body is shiftable in position with respect to said camera from a storage position wherein said inlet opening is away from said flash to an operating position wherein said inlet opening extends about said flash.

22. A camera assembly as recited in claim 21 wherein said outlet opening is covered by a transparent or translucent cover.

23. A camera assembly as recited in claim 21 wherein said camera includes a view finder window and said main body includes a notched section which is dimensioned and arranged such that said main body avoids blocking the view finder window when said main body is in said storage position.

24. A camera assembly, comprising:
a camera housing which supports a lens having a central axis which extends in a first direction;
said camera housing further supporting a flash unit which has a central axis extending in a non-parallel relationship with the central axis of the lens;
said camera housing further supporting a flash light beam shifting device having a reflective surface which is adapted to redirect light beams emanating from the flash unit from a first direction extending essentially parallel to the central axis of the flash unit to a second direction extending essentially parallel to the central axis of said lens, and wherein said flash light beam shifting device includes a rear wall slidingly received within a shoulder portion formed in said housing and an upper wall extending off from said rear wall which also is slidingly received by said housing such that when in a contracted and an extended position said flash unit is surrounded by said rear wall, upper wall and shoulder portion.

25. A camera assembly, comprising:
a camera housing which supports a lens having a central axis which extends in a first direction;
said camera housing further supporting a flash unit which has a central axis extending in a non-parallel relationship with the central axis of the lens;
said camera housing further supporting a flash light beam shifting device having a reflective surface which is adapted to redirect light beams emanating from the flash unit from a first direction extending essentially parallel to the central axis of the flash unit to a second direction extending essentially parallel to the central axis of said lens, and wherein said flash light beam shifting device is slidable with respect to said housing from a storage position to an operating position, and said camera assembly comprising a switch and a flash unit power source and said switch being dimensioned and arranged such that sliding said light beam shifting device from the stowage mode to an operation mode triggers said switch so as to activate said power source.

* * * * *